Figure 1:
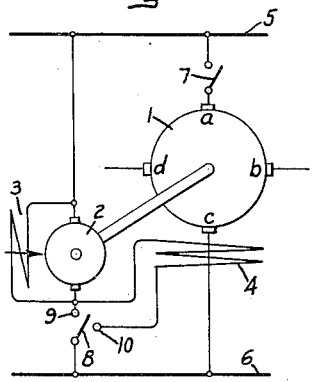

Sept. 22, 1936.	G. M. PESTARINI	2,055,240
ROTARY TRANSFORMER FOR DIRECT ELECTRIC CURRENT
Filed Nov. 8, 1934

Inventor:
Giuseppe M. Pestarini,
by Harry E. Dunham
His Attorney.

Patented Sept. 22, 1936

2,055,240

UNITED STATES PATENT OFFICE 2,055,240

ROTARY TRANSFORMER FOR DIRECT ELECTRIC CURRENT

Giuseppe Massimo Pestarini, Sheffield, England

Application November 8, 1934, Serial No. 752,024
In Great Britain November 15, 1933

8 Claims. (Cl. 171—123)

This invention relates to rotary transformers for direct electric currents and to apparatus for use therewith, and has special reference to devices of this kind, now commonly called metadyne transformers.

A metadyne transformer is a rotary apparatus or dynamo-electric machine which is designed to transform a direct current supplied to it at a fixed voltage and variable amperes into a current of substantially constant amperes and variable voltage or into a current which is related to the voltage in accordance with a desired law. The apparatus comprises in its simplest form a rotor provided with windings and a commutator similar to the armature of a direct current dynamo electric machine. Ordinarily two pairs of brushes are arranged to make contact with the commutator, the primary current passing into and out of the rotor by one pair and the secondary current being available at the other pair. The rotor is rotated at substantially constant speed by an external motor or other means are provided by which the total power input to the transformer is automatically adjusted to be equal to the sum of the output and the losses in the machine at a particular speed so as to maintain the armature in rotation at this speed. The primary current flowing in the rotor windings sets up a primary flux which is fixed in direction and may be said to be cut by rotor conductors in which a voltage is thereby induced and a constant secondary current can be drawn from the secondary circuit or circuits at variable voltage. A stator is provided which affords a return path of low magnetic reluctance for the fluxes which are set up by the rotor currents.

A description of the general construction and operation of metadyne transformers, generators and motors will be found in a paper entitled "Esquisse sur la Metadyne" by G. M. Pestarini in the Bulletin Scientifique A. I. M. No. 4 April 1931 of L'Association des Ingenieurs Electriciens, published by the Institut Electro-technique, Montefiore, Liege.

The stator of a metadyne transformer may be provided with windings by which various magnetic fluxes can be obtained which combine with or modify the magnetic fluxes due to the primary and secondary currents circulating in the rotor and thereby regulate the electro-mechanical performance of the machine. One of these stator windings is termed the regulator winding and is used to adjust the total power input so that the speed will remain substantially constant, as hereinabove described. For this purpose the regulator winding is arranged to produce a magnetic flux coaxial with the primary flux in the metadyne transformer rotor. If the metadyne rotor slows down, due, for example, to an increase in the secondary power output relative to the primary power input, current is caused to flow through the regulator winding so as to increase the primary current and provide an additional driving torque to bring the speed of the metadyne rotor up to the desired normal speed. If the secondary output is relatively decreased the action of the regulator winding will be opposite to that just described, that is it will provide a retarding torque instead of a driving torque for the rotor.

It has already been proposed to obtain the current supply for the regulator winding from a source of direct current of substantially constant voltage through a shunt excited dynamo electric machine, hereinafter referred to as the regulator machine, mounted on the metadyne transformer shaft. It is desirable in order that a comparatively large change in the current through the regulator machine and regulator winding with consequent rapid adjustment of the speed of the metadyne shall be obtained when a comparatively small alteration in speed occurs, that the resistance of the circuit through the regulator machine armature and regulator winding on the metadyne should be low or the regulator machine may be provided with a differential series field winding which induces an electromotive force in the armature in the same direction as that in which the current is flowing and thereby reduces the effective resistance, or current limiting effect, which is produced by the direct current resistance and the counter electromotive force in the circuit. As the regulator winding is of high inductance it will, when in circuit, ensure substantial stability against sudden changes in current notwithstanding that the resistance, current limiting effect or effective resistance of the circuit is low. When however the primary circuit of the metadyne transformer is opened and the regulator winding is cut out, it is desirable that the metadyne transformer continues to rotate, so that it will be in condition for immediate use when the load returns, and as the regulator machine continues to drive the metadyne transformer and remains connected to the source of supply, the regulator machine will be subject to very large rushes of current with even small change of the supply voltage. This liability is increased if the regulator machine is provided with a differential series field winding.

According to the invention in order to avoid the difficulties above indicated the regulator dynamo-electric machine is provided with a stabilizing series field winding as well as a main shunt field winding, that is to say, it is arranged as a compound-wound machine, but the series field winding is arranged to be cut out when the regulator winding on the metadyne transformer is connected in circuit. By this means the resistance of the regulator machine armature circuit may be made low and at the same time excessive changes of current when the regulator winding is cut out may be prevented.

The regulator dynamo-electric machine may also be provided with a differential series winding as hereinbefore indicated, but such a series winding is arranged to be operative only when the regulator winding of the metadyne is in circuit, for example it may be connected in series with said regulator winding.

The main shunt field winding may be provided with a resistance which is cut into circuit so as to weaken the shunt field when the regulator winding of the metadyne transformer is disconnected. This compensates for the increase in the field excitation which would otherwise occur owing to the cutting in of the stabilizing series winding so that the speed of the regulator machine will be maintained substantially constant.

In carrying out the invention the regulator machine may be connected across the same supply terminals as the metadyne transformer. The stabilizing series field winding may be connected to one terminal of the regulator winding of the metadyne transformer or to one terminal of the differential series winding when this is provided, appropriate switches being provided by which one or the other of these circuits can be connected or disconnected as required.

In order that the invention may be more clearly understood it will now be described with reference to the accompanying drawings, which are electrical diagrams illustrating various arrangements of metadyne transformers and regulator machines.

Fig. 1 is a diagram showing the arrangement already known and is included in order that the novel features in the other arrangements may be more readily appreciated.

Figure 2:
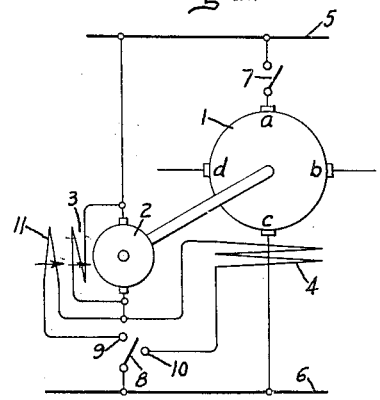
Figure 3:
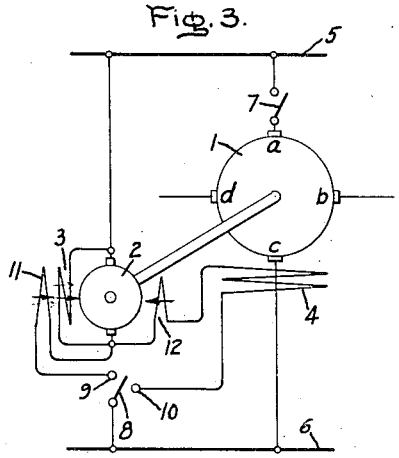
Figure 4:
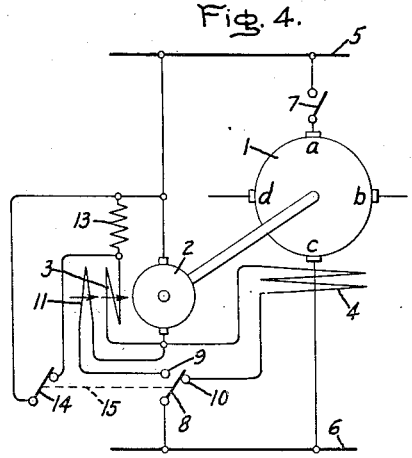

Figs. 2, 3, and 4 are diagrams showing arrangements in accordance with the invention.

In all the diagrams the rotor of the metadyne transformer is indicated at 1 with primary brushes a, c and secondary brushes b, d. The armature of the regulator dynamo-electric machine is indicated at 2 and is mechanically coupled to the metadyne 1, so as to maintain a predetermined speed relation between the two machines. The regulator machine is provided with a shunt field winding 3 which produces a flux as indicated by the arrow on the drawing, and a regulator winding on the stator of the metadyne dynamo-electric machine is indicated at 4. Substantially constant voltage direct current mains 5 and 6 are provided to which the machines may be connected through switches 7 and 8, respectively.

The switch 8, in Fig. 1, may be operated so as either to make contact with fixed contact 9 connected to the armature 2 of the regulator machine in which case the regulator winding 4 of the metadyne transformer is cut out or to make connection with the fixed contact 10 whereby the regulator winding 4 will be cut into circuit with the regulator machine. It will be observed that if the resistance of the armature 2 of the regulator machine is very low the cutting out of the regulator winding 4 will cause the regulator machine to be subject to large rushes of current if the voltage of the direct current supply mains 5 and 6 should change by even a small amount.

In Fig. 2, which illustrates an arrangement according to the present invention the regulator machine is provided with a stabilizing series field magnet winding 11 which produces a flux as indicated by the arrow on the drawing and is interposed between the fixed contact 9 of the switch 8 and the armature 2 of the regulator machine so that when the regulator winding is cut out the series field magnet winding will be included in circuit and thereby prevent excessive changes in current through the regulator machine. When the regulator winding 4 is cut into circuit by moving switch 8 to make connection with fixed contact 10 the series field winding 11 will be cut out, thereby varying the current limiting effect of the circuit including the regulator machine 2.

In Fig. 3, the regulator machine 2 is provided with a differential series winding 12 for varying the current limiting effect of the circuit including the regulator machine 2, which as will be seen from an inspection of the figure is only included in circuit when the regulator winding 4 is cut in by turning switch 8 to make connection with fixed contact 10 and which produces a flux as indicated by the arrow on the drawing. The differential series field winding will therefore not oppose the stabilizing effect of the field winding 11 when the regulator winding 4 is cut out.

In Fig. 4 the arrangements are similar to those of Fig. 2 but a resistance 13 is connected in series with the shunt field winding 3 and may be cut in and out by means of the switch 14. When the switch 8 is operated to the position shown to make connection with the fixed contact 10 so that the regulator winding 4 is in circuit, the switch 14 is turned to the position shown in which the resistance 13 is short circuited. When, however, the switch 8 is operated to make connection with the fixed contact 9 thereby cutting out the regulator winding 4 the switch 14 is opened so that the resistance 13 will be included in circuit with the shunt field winding 3 and the shunt field excitation is thereby weakened for the purpose hereinbefore described. The switches 14 and 8 may be mechanically connected, as indicated by the broken line 15, so that simultaneous operation is ensured.

It will be clear without further description that resistance 13 may be employed in a similar manner when a differential series field winding 12 is provided as shown in Fig. 3.

The drawing indicates the metadyne transformer and the regulator machine as being connected in parallel to the same mains; obviously separate sources of substantially constant voltage direct current may be provided for the two machines.

I claim:—

1. A commutating type metadyne transformer having a rotor provided with a primary brush set and a secondary brush set electrically displaced from said primary brush set, means including a field exciting winding for maintaining the speed of said metadyne transformer substantially constant, means for energizing said field exciting winding, means including a dynamo-electric machine for varying the energization of said metadyne transformer field exciting winding, means for driving said dynamo-electric machine in a predetermined speed relation to the speed of said metadyne transformer, and means for connecting and disconnecting said metadyne transformer field exciting winding from said energizing means and for coincidentally varying the current limiting effect of said dynamo-electric machine.

2. A commutating type metadyne transformer having a rotor provided with a primary brush set and a secondary brush set electrically displaced from said primary brush set, means including a field exciting winding for maintaining the speed of said metadyne transformer substantially constant, means for energizing said field exciting winding, means including a dynamo-electric machine for varying the excitation of said metadyne transformer field exciting winding, means for driving said dynamo-electric machine in a predetermined speed relation to the speed of said metadyne transformer, means including a field exciting winding for said dynamo-electric machine for varying the current limiting effect thereof, and means for connecting and disconnecting said metadyne transformer field exciting winding from said energizing means and for coincidentally varying said dynamo-electric machine current limiting effect varying means.

3. A commutating type metadyne transformer having a rotor provided with a primary brush set and a secondary brush set electrically displaced from said primary brush set, means including a field exciting winding for maintaining the speed of said metadyne transformer substantially constant, means for energizing said field exciting winding, means including a dynamo-electric machine for varying the energization of said field exciting winding, means for driving said dynamo-electric machine in a predetermined speed relation to the speed of said metadyne transformer, a field exciting winding for said dynamo-electric machine, means for energizing said dynamo-electric machine field exciting winding in accordance with the potential across said dynamo-electric machine, and means for connecting and disconnecting said metadyne transformer field exciting winding from said energizing means and for coincidentally varying the current limiting effect of said dynamo-electric machine.

4. A commutating type metadyne transformer having a rotor provided with a primary brush set and a secondary brush set electrically displaced from said primary brush set, means including a field exciting winding for maintaining the speed of said metadyne transformer substantially constant, means for energizing said field exciting winding, means including a dynamo-electric machine for varying the energization of said metadyne transformer field exciting winding, means for driving said dynamo-electric machine in a predetermined speed relation to the speed of said metadyne transformer, a field exciting winding for said dynamo-electric machine, means for energizing said dynamo-electric machine field exciting winding in accordance with the potential across said dynamo-electric machine, a second field exciting winding for said dynamo-electric machine, and means for connecting and disconnecting said metadyne transformer field exciting winding from said energizing means and utilizing said second field exciting winding for coincidentally varying the current limiting effect of said dynamo-electric machine.

5. A commutating type metadyne transformer having a rotor provided with a primary brush set and a secondary brush set electrically displaced from said primary brush set, means including a field exciting winding for maintaining the speed of said metadyne transformer substantially constant, means for energizing said field exciting winding, means including a dynamo-electric machine for varying the energization of said metadyne transformer field exciting winding, means for driving said dynamo-electric machine in a predetermined speed relation to the speed of said metadyne transformer, a field exciting winding for said dynamo-electric machine, means for energizing said dynamo-electric machine field exciting winding in accordance with the potential across said dynamo-electric machine, a second field exciting winding for said dynamo-electric machine, a third field exciting winding arranged in opposition to said first mentioned dynamo-electric machine field exciting winding, and means for connecting and disconnecting said metadyne transformer field exciting winding and said third dynamo-electric machine field exciting winding from said energizing means and utilizing said second field exciting winding for coincidentally varying the current limiting effect of said dynamo-electric machine.

6. An electrical system including a source of electrical power supply, a commutating type metadyne transformer having a rotor provided with a primary brush set and a secondary brush set electrically displaced from said primary brush set, means for connecting said primary brush set to said source of electrical power supply, a field exciting winding for said metadyne transformer, means for energizing said field exciting winding, means including a dynamo-electric machine and dependent upon the speed of said metadyne transformer for varying the energization of said metadyne transformer field exciting winding, a field exciting winding for said dynamo-electric machine, means for connecting said dynamo-electric machine field exciting winding across said dynamo-electric machine, a second field exciting winding for said dynamo-electric machine, and means for connecting and disconnecting said metadyne transformer field exciting winding from said source of electrical power supply and for coincidentally connecting and disconnecting said second dynamo-electric machine field exciting winding from said source of electrical power supply.

7. An electrical system including a source of electrical power supply, a commutating type metadyne transformer having a rotor provided with a primary brush set and a secondary brush set electrically displaced from said primary brush set, means for connecting said primary brush set to said source of electrical power supply, a field exciting winding for said metadyne transformer, means for energizing said field exciting winding, means dependent upon the speed of said metadyne transformer and including a dynamo-electric machine for varying the energization of said metadyne transformer field exciting winding, a field exciting winding for said dynamo-electric machine, means for connecting said dynamo-electric machine field exciting winding across said dynamo-electric machine, a second field exciting winding for said dynamo-electric machine, a third field exciting winding for said dynamo-electric machine, means connecting said third dynamo-electric machine field exciting winding in series circuit relation with said metadyne transformer field exciting winding and in opposition to said first mentioned dynamo-electric machine field exciting winding, and means for connecting said metadyne transformer field exciting winding and for simultaneously disconnecting said second dynamo-electric machine field exciting winding from said source of electrical power supply and for disconnecting said metadyne transformer field exciting winding and for simultaneously connecting said second dynamo-electric machine field exciting winding to said source of electrical power supply.

8. An electrical system including a source of electrical power supply, a commutating type metadyne transformer having a rotor provided with a primary brush set and a secondary brush set electrically displaced from said primary brush set, means for connecting said primary brush set to said source of electrical power supply, a field exciting winding, means for energizing said field exciting winding, means including a dynamo-electric machine and utilizing said metadyne transformer field exciting winding for producing a driving torque during subnormal operating speed conditions and for producing a retarding torque during operating speed conditions above normal to maintain the speed of said metadyne transformer substantially constant, a field exciting winding for said dynamo-electric machine, a current limiting device, means for connecting said dynamo-electric machine field exciting winding in series with said current limiting device, means including a second field exciting winding for said dynamo-electric machine for providing a component of excitation in opposition to said first mentioned dynamo-electric machine field exciting winding, and means for connecting said metadyne transformer field exciting winding and for simultaneously disconnecting said second dynamo-electric machine field exciting winding from said source of electrical power supply and for disconnecting said metadyne transformer field exciting winding and for simultaneously connecting said second dynamo-electric machine field exciting winding to said source of electrical power supply, said last mentioned means rendering ineffective said current limiting device upon disconnecting of and rendering effective said current limiting device upon connecting of said second dynamo-electric machine field exciting winding from said source of electrical power supply.

GIUSEPPE MASSIMO PESTARINI.